(12) United States Patent
Suzuki et al.

(10) Patent No.: US 7,642,689 B2
(45) Date of Patent: Jan. 5, 2010

(54) ROTOR STRUCTURE

(75) Inventors: Yuzuru Suzuki, Nagano-ken (JP);
Takayuki Yamawaki, Nagano-ken (JP);
Hiroyuki Furusaki, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 12/214,153

(22) Filed: Jun. 17, 2008

(65) Prior Publication Data
US 2009/0001826 A1 Jan. 1, 2009

(30) Foreign Application Priority Data
Jun. 26, 2007  (JP) .............................. 2007-167399

(51) Int. Cl.
*H02K 1/27* (2006.01)

(52) U.S. Cl. ............... 310/261.1; 310/152; 310/154; 310/156.11; 310/156.01; 310/125

(58) Field of Classification Search ............ 310/261.1, 310/154.12, 152, 154.25, 156.11, 154.32, 310/156.01; *H02K 1/27*
See application file for complete search history.

(56) References Cited

U.S. PATENT DOCUMENTS

| 6,969,937 | B1 * | 11/2005 | Schuering | 310/156.48 |
| 7,151,336 | B2 | 12/2006 | Yokochi et al. | |
| 2004/0046469 | A1 * | 3/2004 | Oshima et al. | 310/156.21 |
| 2004/0217664 | A1 * | 11/2004 | Kuwabara et al. | 310/156.21 |
| 2006/0087188 | A1 * | 4/2006 | Petro et al. | 310/156.38 |
| 2007/0170803 | A1 * | 7/2007 | Yabe et al. | 310/162 |

FOREIGN PATENT DOCUMENTS

| JP | UM-A-04-097445 | 8/1992 |
| JP | A-06-245476 | 9/1994 |
| JP | UM-A-07-016558 | 3/1995 |
| JP | A-09-056140 | 2/1997 |
| JP | A-09-200983 | 7/1997 |
| JP | A-10-201152 | 7/1998 |
| JP | A-2004-120891 | 4/2004 |
| JP | A-2005-192288 | 7/2005 |

* cited by examiner

*Primary Examiner*—Quyen Leung
*Assistant Examiner*—Terrance Kenerly
(74) *Attorney, Agent, or Firm*—McDermott Will & Emery LLP

(57) ABSTRACT

A rotor includes: a magnet having a circular cylinder shape and having a hole formed through its axial center, wherein the hole has in axial cross section a regular polygonal shape having flat portions and angle portions, and wherein a recess having a truncated cone shape is disposed at an axial end of the magnet such that the recess has its maximum diameter portion located at the axial end and has its minimum diameter portion communicating with the hole; and a shaft fitted in the hole of the magnet, wherein the outer circumference of the shaft makes contact with the flat portions of the hole of the magnet thereby forming a plurality of gaps between the outer circumference of the shaft and the angle portions of the hole of the magnet, and adhesive is filled in the gaps.

2 Claims, 4 Drawing Sheets

PRIOR ART

PRIOR ART

ROTOR STRUCTURE

CROSS-REFERENCE TO RELATED APPLICATIONS

This application claims priority to Japanese Patent Application No. 2007-167399, filed Jun. 26, 2007, which is expressly incorporated herein by reference and made a part hereof.

FEDERALLY SPONSORED RESEARCH OR DEVELOPMENT

Not Applicable.

TECHNICAL FIELD

The present invention relates to a structure of a rotor incorporated in, for example, a small permanent magnet (PM) stepping motor.

BACKGROUND OF THE INVENTION

As electric equipments are becoming smaller and smaller, a stepping motor of claw pole type (so-called "PM stepping motor") for use in such electric equipment is requested to be downsized and also to provide an enhanced performance. Under such circumstances, a rotor magnet must be downsized and also improvement must be sought in the method of fixing a rotor shaft to the magnet.

For example, an Nd—Fe—B bonded magnet having a high magnetic characteristic is commonly used as a rotor magnet, and such a magnet is fixed to a rotor shaft such that an adhesive is applied to a portion of the outer circumference of the shaft, and then the shaft is inserted through an axial hole of the magnet thereby filling the adhesive into a gap present between the shaft and the magnet.

In this method, the shaft with adhesive applied thereon is slid through the hole of the magnet to its predetermined position, and some portion of the adhesive is not introduced into the hole of the magnet, specifically into the gap between the shaft and the magnet, and is caused to build up on the shaft at one end of the magnet, and it is necessary to wipe the built-up adhesive off the shaft. Also, since even a portion of the adhesive that is required to duly fix the shaft to the magnet is not introduced into the gap between the shaft and the magnet, it happens that the shaft can not be kept securely fixed to the magnet.

In order to overcome the above problem of adhesive building up at a shaft at one end of a magnet, a truncated cone-shaped recess as an adhesive reservoir is formed at one end of the magnet (refer, for example, to Japanese Utility Model Application Laid-Open No. H04-097445).

FIG. 1A shows a side of such a rotor as described above, wherein a shaft 102 is to be inserted in a hole of a magnet 101, and FIG. 1B shows a cross section of the magnet 101 shown in FIG. 1A.

Referring to FIG. 1A, an adhesive 105 is applied to a portion of the shaft 102 in a line (or at a point), and the shaft 102 with the adhesive 105 applied thereon is inserted into a hole 103 of the magnet 101 from an end of the magnet 101 provided with a truncated cone-shaped recess 104. Thanks to the recess 104 having a truncated cone shape with an inclined wall, the adhesive 105 is adapted to be smoothly introduced into a gap between the shaft 102 and the inner circumferential surface of the hole 103 and well spread in the gap, thus enhancing the pull-out resistance of the shaft 102 with respect to the magnet 101. After the shaft 102 is inserted and positioned in place, some portion of the adhesive 105 that is not introduced into the gap is lodged in the recess 104 and does not protrude from the end of the magnet 101 thus not obstructing the rotation of the rotor.

In this method, however, due to the adhesive 105 filled in the gap between the inner circumferential surface of the hole 103 and the outer circumferential surface of the shaft 102, it may happen that the magnet 101 and the shaft 102 are not disposed coaxial with each other, in which case the rotor has a runout thereby causing vibration. In order to deal with this runout problem, the magnet 101 and the shaft 102 must be supported by a tool coaxially with each other until the adhesive 105 is cured, which results in a deteriorated workability.

Under the circumstances, a rotor is disclosed in which a shaft is fixedly disposed coaxially with a magnet in a mechanical manner (refer, for example, to Japanese Patent Application Laid-Open No. H09-200983).

FIG. 2 shows a side (partly cross-sectioned) of a rotor as described above, and FIG. 3 shows an axial end of a magnet 210 shown in FIG. 2.

Referring to FIG. 3, the magnet 210 has a hole 211 and includes a shaft retaining mechanism structured such that a plurality (four in the figure) of retainer segments 214 each defining a flat face 217 are provided equiangularly at an inner circumferential surface 211a of the magnet 210, wherein a circular line connecting the center points of respective flat faces 217 of the retainer segments 214 defines a virtual precise circle which is situated in a concentric manner with the magnet 210. The retainer segments 214 extend axially to divide the inner circumferential surface 211a into a plurality (four in the figure) of curved segments 216.

Referring to FIGS. 2 and 3, a shaft 220 is inserted in the hole 211 of the magnet 210 and supported therein by the retainer segments 214 of the shaft retaining mechanism, specifically at the center points of the flat faces 217 of the retainer segments 214, and adhesive is filled in gaps formed between the shaft 220 and the curved segments 216, whereby the shaft 220 can be securely fixed to the rotor magnet 210 and at the same time can be set coaxially with respect to the magnet 210.

In the structure of the rotor described above, however, the gap between the shaft 220 and the curved segments 216 is small, and consequently it is difficult to fill adhesive into the gap. Also, it is difficult to know the amount of adhesive which is introduced in the gap between the shaft 220 and the curved segments 216.

SUMMARY OF THE INVENTION

The present invention has been made in light of the above problems, and it is an object of the present invention to provide a rotor, in which a shaft is securely fixed to a magnet by adhesive, and the amount of adhesive filled in a gap between the shaft and the magnet can be readily determined.

According to an aspect of the present invention, there is provided a rotor which includes: a magnet having a circular cylinder shape and having a hole formed through its axial center, wherein the hole has in axial cross section a regular polygonal shape having flat portions and angle portions, and wherein a recess having a truncated cone shape is disposed at an axial end of the magnet such that the recess has its maximum diameter portion located at the axial end of the magnet and has its minimum diameter portion communicating with the hole; and a shaft fitted in the hole of the magnet, wherein the outer circumference of the shaft makes contact with the flat portions of the hole of the magnet thereby forming a plurality of gaps between the outer circumference of the shaft and the angle portions of the hole of the magnet, and adhesive is filled in the gaps.

In the aspect of the present invention, the volume calculated by deducting the volume of a portion of the shaft residing in the recess from the gross capacity of the recess may be substantially equal to the total volume of the plurality of gaps.

In the aspect of the present invention, the angle portions of the regular polygonal shape of the hole of the magnet may be rounded, and the distance from the outer circumference of the shaft to the angle portion may be 0.05 mm or smaller.

In the aspect of the present invention, the wall inclination angle of the recess with respect to the axis of the magnet may range from 30 to 60 degrees.

According to the present invention, a rotor is provided, in which a shaft is securely fixed to a magnet by adhesive, and the amount of adhesive filled in a gap between the shaft and the magnet can be readily determined.

BRIEF DESCRIPTION OF THE DRAWINGS

FIGS. 7A and 7B are schematic views of the rotor of FIG. 4, explaining in combination a process of producing the rotor, wherein FIG. 7A is a side view of the shaft to be inserted into the magnet, FIG. 7B is a side view of the shaft inserted in the magnet with adhesive being filled into gaps between the shaft and the magnet;

DETAILED DESCRIPTION

An exemplary embodiment of the present invention will be described with reference to the accompanying drawings.

The present invention relates to a structure of a rotor for a PM stepping motor, and therefore explanations and drawings of other portions of the PM stepping motor are omitted.

Figure 1A:
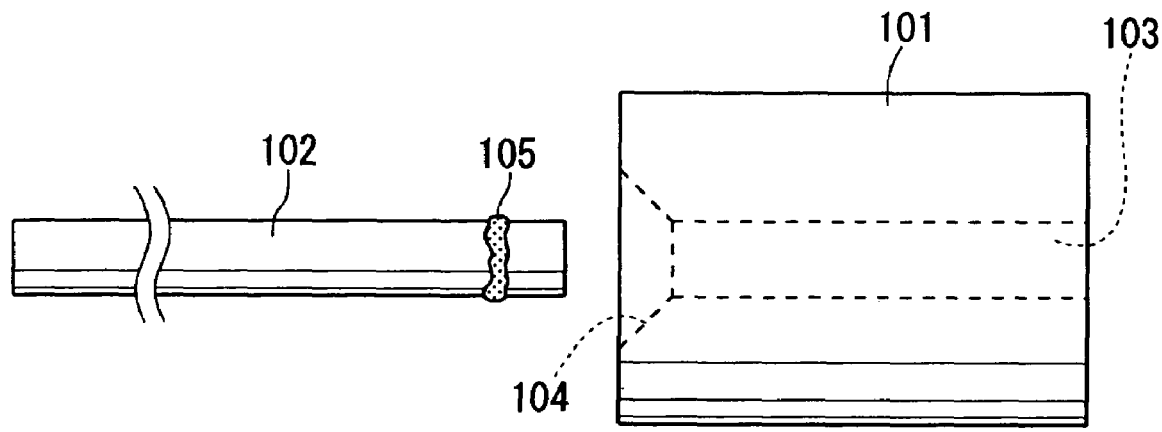
FIG. 1A is a schematic side view of a conventional rotor, showing a shaft yet to be inserted in a rotor.
Figure 1B:
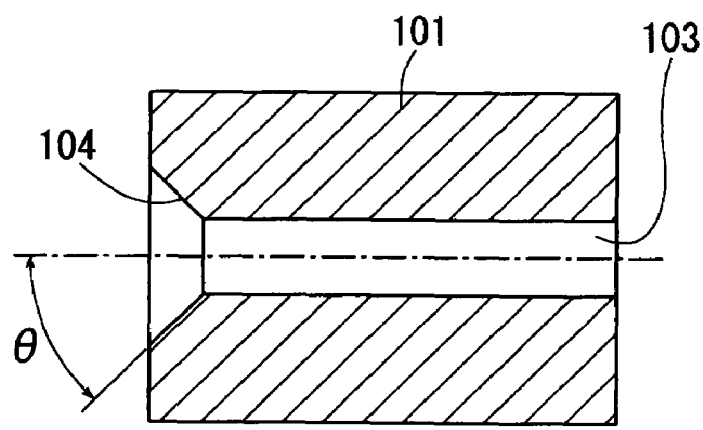
FIG. 1B is a cross sectional view of the rotor shown in FIG. 1A.
Figure 2:
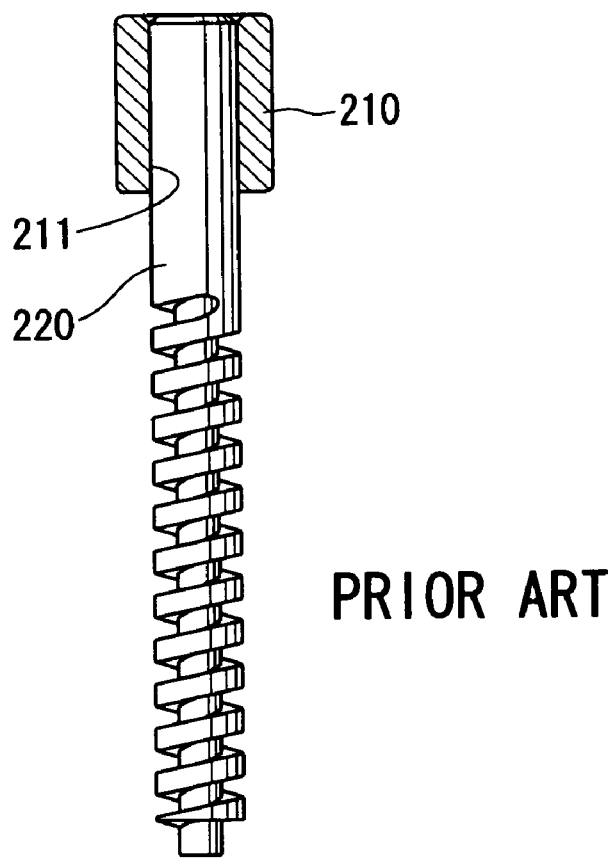
FIG. 2 is a side view (partly cross sectioned) of another conventional rotor.
Figure 3:
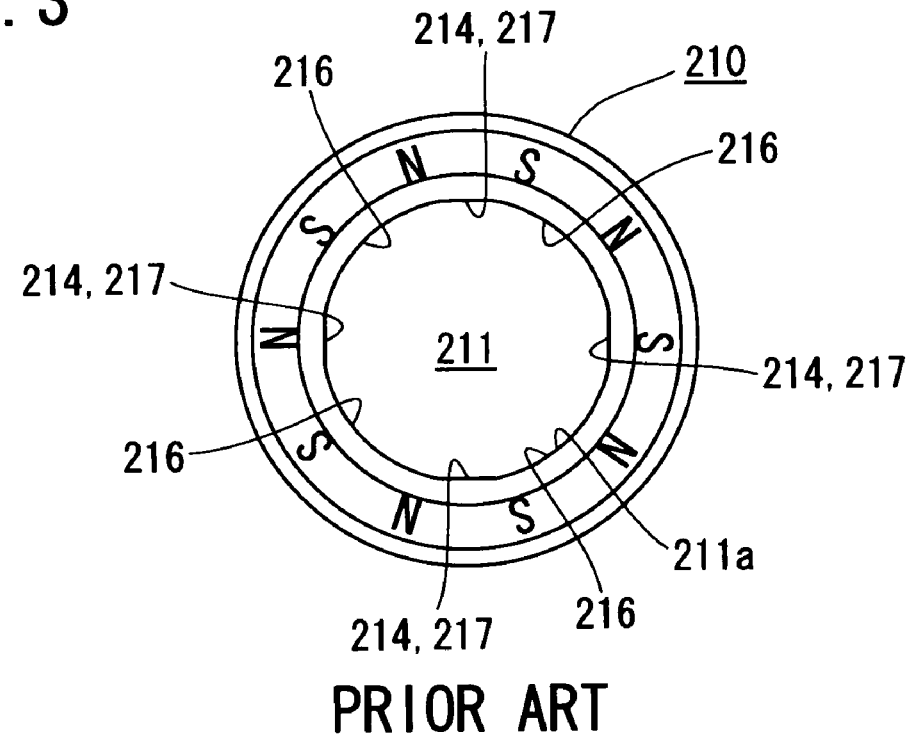
FIG. 3 is a schematic top plan view of a magnet of the rotor of FIG. 2.
Figure 4:
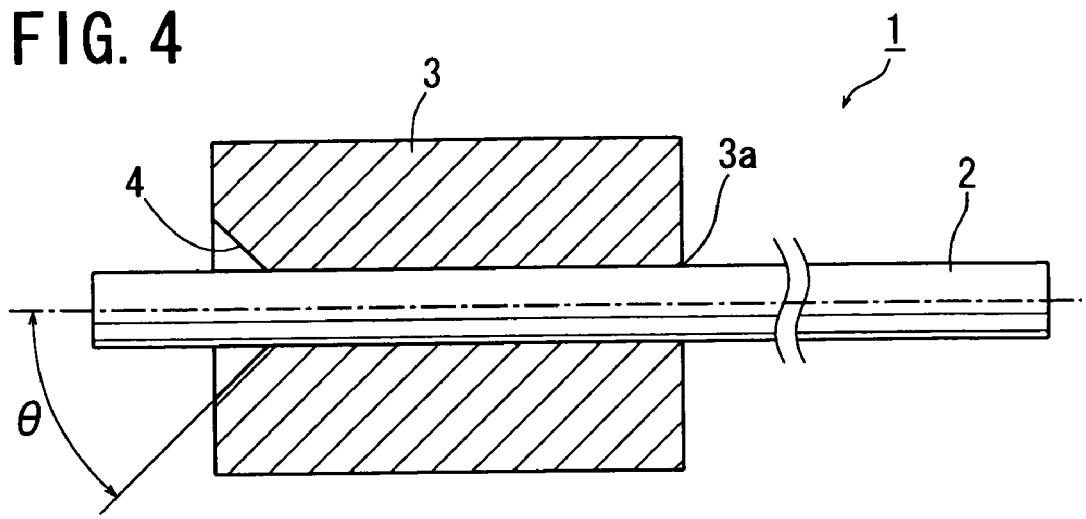
FIG. 4 is a cross sectional view of a rotor according to an embodiment of the present invention, in which a shaft is attached to a magnet.

Referring to FIG. 4, a rotor 1 according to an embodiment of the present invention includes a shaft 2 and a magnet 3 attached to the shaft 2. The shaft 2 is a round bar made of metal, and the magnet 3 is an Nd—Fe—B bonded magnet having a circular cylinder shape and having its outer circumference multipole-magnetized in the circumferential direction.

The cylindrical magnet 3 has a hole 3a formed through its axial center, and a recess 4 having a truncated cone shape is formed at one axial end of the magnet 3 so as to communicate with the hole 3a. The hole 3a has a regular hexagonal shape in radial cross section defining six flat portions 3b and six angle portions 3c as shown in FIG. 5, wherein the six angle portions 3c are rounded for reduction of stress concentration.

Figure 5:
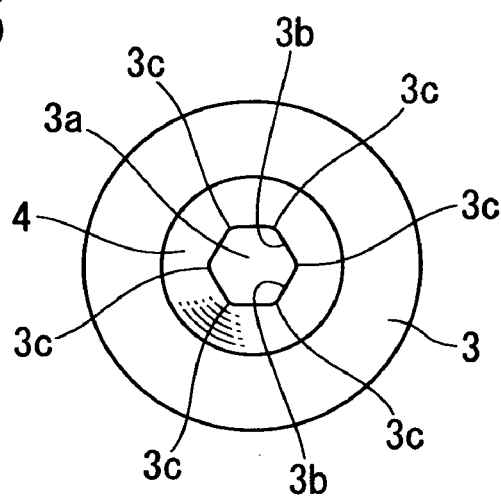
FIG. 5 is an axial end view of the magnet shown in FIG. 4, showing an end of the magnet having a recess.
Figure 6:
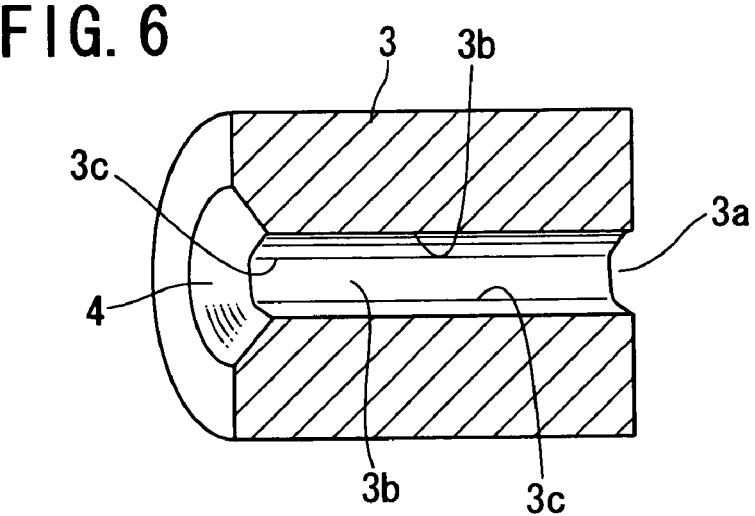
FIG. 6 is a perspective cross sectional view of the magnet shown in FIG. 4.

When the shaft 2 having a round cross section is fitted in the hexagonal hole 3a of the magnet 3 configured as shown in FIGS. 5 and 6, the outer circumference of the shaft 2 makes line contact with the respective middle points of the flat portions 3b of the hole 3a, and a gap 3d (refer to FIG. 7D) is formed between two adjacent contact points thus providing six of such gaps 3d located equiangularly.

Description will now be made, with reference to FIGS. 7A to 7D, on a method of producing the rotor 1 of FIG. 4.

Figure 7A:
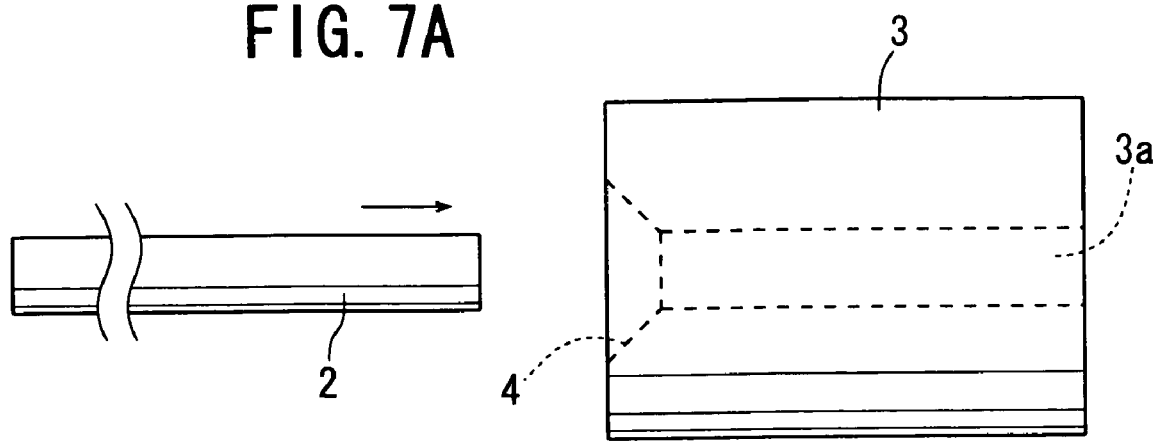

Referring first to FIG. 7A, the shaft 2 is fitted into the hole 3a of the magnet 3 and moved therethrough to a predetermined position with respect to the magnet 3.

Figure 7B:
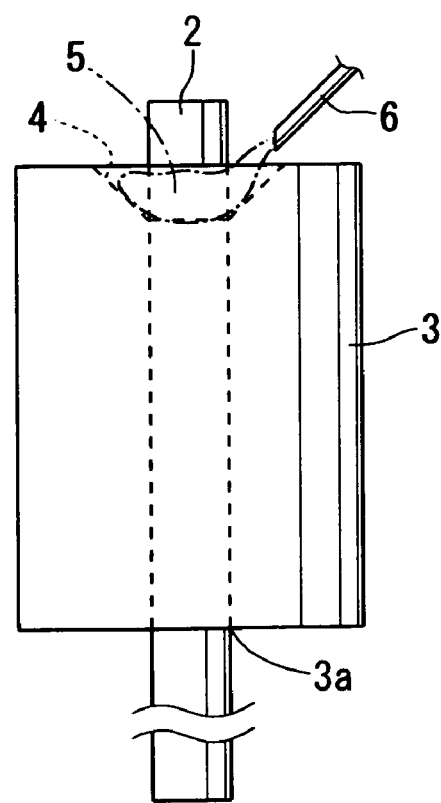
Figure 7C:
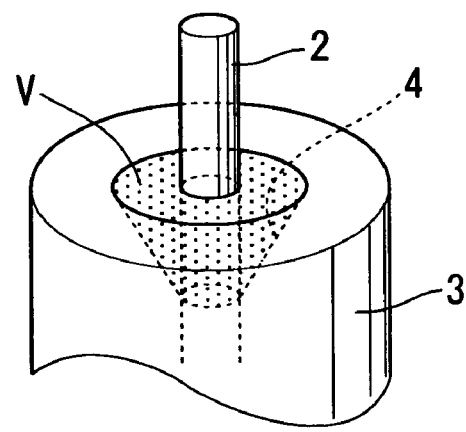
FIG. 7C is a perspective schematic view of the rotor, explaining a volume capacity of a recess for receiving the adhesive.

Then, the magnet 3 having the shaft 2 fitted therein is held by a simple tool (not shown) with the recess 4 positioned upside, and a predetermined amount of adhesive 5 is supplied into the recess 4 from a discharge gate 6 of a dispenser (not shown) as shown in FIG. 7B.

The adhesive 5 is, for example, thermo-setting epoxy which has some degree of viscosity and hardly flows at room temperature, becomes fluid when heated, and which, when cooled, is hardened and cured to generate adhesive force.

Since the shaft 2 is fitted in the hole 3a of the magnet 3, the adhesive 5 supplied in the recess 4 having a volume capacity V (shaded portion in FIG. 7C) stays in the recess 4 without flowing into the gaps 3d due to its viscosity.

Figure 7D:
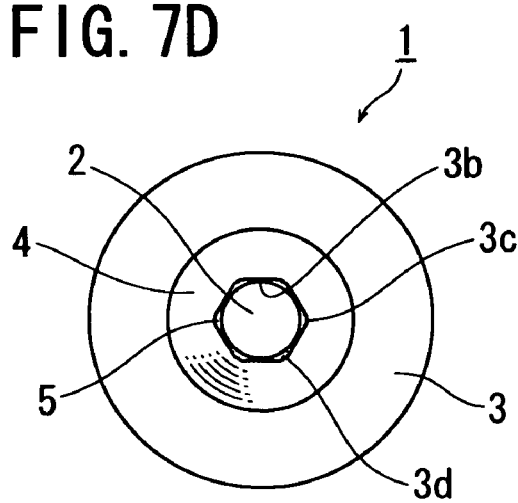
FIG. 7D is a top plan view of the rotor, wherein the shaft is inserted in the magnet, and the adhesive is filled in the gaps.

The adhesive 5 supplied in the recess 4 is then heated under predetermined conditions, thereby becomes flowable to flow into the gaps 3d by capillary action and is filled therein as shown in FIG. 7D. The adhesive 5 filled in the gaps 3d is hardened and cured, and the shaft 2 is fixed to the magnet 3.

In the present invention, since the outer circumference of the shaft 2 makes line contact with the plurality of flat portions 3b of the regular polygonal (hexagonal in the embodiment) shaped hole 3a of the magnet 3 when the shaft 2 is fitted in the hole 3a, the shaft 2 can be held surely and positioned coaxial with respect to the magnet 3 without using a jig to hold the shaft 2 in place with respect to the magnet 3 during the process of filling the adhesive 5 into the gaps 3d. This contact structure of the shaft 2 with the plurality of flat portions 3d of the hole 3d of the magnet 3 helps effectively release and disperse the shaft-fitting stress applied to the magnet thereby preventing the magnet 3 from cracking.

Also, in the present invention, the distance from the outer circumference of the shaft 2 to the angle portion 3c of the hole 3a is set at 0.05 mm or smaller, in which case the adhesive 5 is appropriately filled in the gaps 3d. If the distance is set to exceed 0.05 mm, it may happen that the adhesive 5 once introduced in the gaps 3d is caused to leak from the other axial end (downside in FIG. 7B) of the magnet 3. However, if the distance therebetween is set too small, some adhesives, depending on viscosity, may not properly flow into the gaps 3d therefore failing to achieve a sufficient adhesive strength. Accordingly, the distance is optimally determined with the upper limit of 0.05 mm in view of the above concerns.

Further, in the present invention, the truncated cone-shaped recess 4 has its wall inclination angle θ (refer to FIG. 4) set at 45 degrees. A small PM stepping motor incorporating a rotor structure according to the present embodiment and used in a digital camera or a mobile telephone has an outer diameter of about 6 mm, and a magnet for such a small motor has an outer diameter of as small as about 3 mm.

If the angle θ is set by far smaller than 45 degrees, the radial dimension of the recess 4 decreases making it difficult to put the adhesive 5 into the recess 4 from the discharge gate 6 of the dispenser, and the axial dimension (depth) of the recess 4 increases making it difficult to conduct a measurement of the decrease in the volume of the adhesive 5 left in the recess 4 wherein the measurement is performed by using a microscope.

On the other hand, if the angle θ is set by far larger than 45 degrees, the radial dimension of the recess 4 increases, which, while making it easy to put the adhesive 5 into the recess 4, results in that the wall inclination of the recess 4 becomes too gentle for the adhesive 5 to smoothly flow on the wall of the recess 4 thus allowing the adhesive 5 to remain on the wall of the recess 4, and also the increase of the radial dimension of the recess 4 makes the outer circumference of the recess 4 closer to the outer circumference of the magnet 3 thereby causing the outer circumferential portion of the magnet 3 to be easily damaged.

In view of the difficulties described above, the angle θ is set between 30 and 60 degrees, and preferably at 45 degrees.

With the recess 4 structured as described above, the amount of the adhesive 5 filled into the gaps 3*d* can be estimated by the amount of the adhesive 5 left in the recess 4 without using a measurement instrument. Practically, the recess 4 is arranged such that a volume calculated by deducting the volume of a portion of the shaft 2 residing within the recess 4 from the gross capacity of the recess 4 is equivalent to the total volume of all the gaps 3*d*, whereby when the recess 4 is filled up by the adhesive 5 to its full capacity, the amount of the adhesive 5 filled into the gaps 3*d* can be roughly calculated by simply taking a look at the amount of the adhesive 5 left in the recess 4, which enables the quality of adhesive strength to be readily and quickly determined.

The hole 3*a* of the magnet 3 has a hexagonal shape in cross section in the embodiment, but the present invention is not limited to such an arrangement and the hole 3*a* of the magnet 3 may alternatively have a regular polygonal shape in cross section, such as a regular triangle, tetragon or octagon, and the viscosity of the adhesive 5 is optimally determined depending on the cross sectional shape of the hole 3*a*.

Also, the magnet 3 is a rare earth bonded magnet in the embodiment, but the present invention is not limited to such a magnet arrangement, and the magnet 3 may be a ferrite bonded magnet or sintered magnet.

And, the adhesive 5 is not limited to thermo-setting epoxy but may alternatively be, for example, slow curing cyanoacrylate adhesive.

What is claimed is:

1. A rotor comprising:

a magnet having a circular cylinder shape and having a hole formed through its axial center, wherein the hole has in axial cross section a regular polygonal shape having flat portions and angle portions, and a recess having a truncated cone shape is disposed at an axial end of the magnet such that the recess has its maximum diameter portion located at the axial end and has its minimum diameter portion communicating with the hole;

a shaft fitted in the hole of the magnet, wherein an outer circumference of the shaft makes contact with the flat portions of the hole of the magnet thereby forming a plurality of gaps between the outer circumference of the shaft and the angle portions of the hole of the magnet, and adhesive is filled in the gaps, wherein a volume calculated by deducting a volume of a portion of the shaft residing in the recess from a gross capacity of the recess is substantially equal to a total volume of the plurality of gaps; and, wherein the angle portions of the polygonal shape of the hole of the magnet are rounded, and a distance from the outer circumference of the shaft to the angle portion is 0.05 mm or smaller.

2. A rotor according to claim 1, wherein a wall inclination angle of the recess with respect to an axis of the magnet ranges from 30 to 60 degrees.

\* \* \* \* \*